Nov. 7, 1939.  A. D. SIEDLE  2,178,883
ABSORBER FOR REFRIGERATING SYSTEMS
Filed June 6, 1936

INVENTOR
Arnold D. Siedle
BY
Harry S. Demarse
ATTORNEY

Patented Nov. 7, 1939

2,178,883

UNITED STATES PATENT OFFICE 2,178,883

ABSORBER FOR REFRIGERATING SYSTEMS

Arnold D. Siedle, Canton, Ohio, assignor to The Hoover Company, North Canton, Ohio, a corporation of Ohio Application June 6, 1936, Serial No. 83,878

10 Claims. (Cl. 62—119.5)

This invention relates to continuous absorption refrigerating systems of the type in which an inert gas is employed and more particularly to absorbers adapted for use in such systems and to means for circulating fluids therein.

It is an object of the present invention to provide improved means for circulating fluids in an absorber of a continuous absorption system. It is a further object of the invention to provide fluid circulating means which may be hermetically sealed in an absorber of an absorption refrigerating system and which in addition to causing both the gas and the liquid to flow in a desired direction through the absorber and other parts of the system, brings the gas and liquid into very intimate contact and throws them about and in contact with each other and with the inside of the absorber vessel so as to improve the absorption and aid in the transfer of heat of absorption to some heat transfer medium on the outside of the vessel such as air.

It is another object of the invention to provide an absorber for a refrigerating system in which novel means is provided for pumping or lifting the liquid therein while at the same time throwing it in contact with gases within the absorber.

Other objects and advantages reside in certain novel features of the arrangement and construction of parts as will be apparent from the following description taken in connection with the accompanying drawing in which, Figure 1 is a diagrammatic representation of a continuous absorption refrigerating system with an absorber constructed in accordance with the present invention incorporated therein.

Figure 1:
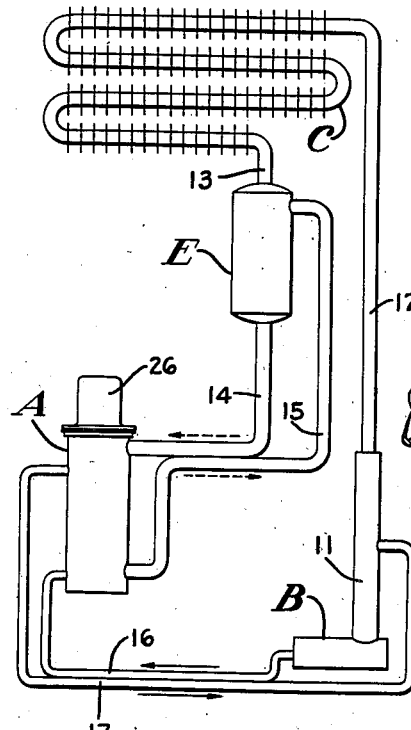

Referring to the drawing in detail and first to the diagram of Figure 1, it will be seen that a continuous absorption refrigerating system is there illustrated as consisting of a boiler B, a condenser C, an evaporator E and an absorber A, these parts being connected by various conduits to form a complete refrigerating system.

The boiler B may consist of a horizontal vessel to which heat may be supplied by a gas burner or other suitable means in accordance with known practice. A vertically extending pipe 11 may be associated with the boiler B and may be provided with baffle plates to provide for analyzing action in accordance with the structure disclosed and claimed in the co-pending application of Curtis C. Coons entitled Absorption refrigeration, Serial Number 81,676, filed May 25, 1936.

As refrigerant is generated in the boiler B it passes through the conduit 12 into the condenser C where it is liquified and flows through the conduit 13 into the evaporator E. The evaporator E is connected to the absorber A by means of two inert gas conduits 14 and 15 which may be in heat exchange relation. By means which will presently be described the inert gas is circulated through the absorber, the conduit 15, the evaporator E and the conduit 14. As the inert gas circulates through the evaporator E, the refrigerant supplied thereto through the conduit 13 evaporates into this inert gas stream to produce refrigeration. The refrigerant gas is then conveyed through the conduit 14 into the absorber.

The absorber is connected to the boiler and analyzer by means of the conduits 16 and 17 which may be in heat exchange relation. The conduit 16 connects the bottom of the absorber to the bottom of the boiler and the conduit 17 connects the top of the absorber to the top of the boiler or to the dome 11, as illustrated. By means which will presently be described, absorption liquid is lifted upwardly in the absorber from the point of connection of the conduit 16 to the outlet of the absorber which is the point of connection of the conduit 17. The absorption liquid flows by gravity through the conduit 17 into the dome 11 and then by gravity through the boiler B and back to the lower part of the absorber A through the conduit 16. The combination shown in Figure 1 being old no further description of the system is deemed necessary.

The present invention is concerned entirely with the construction of the absorber and with the means for causing fluid to flow therethrough and the means for transferring heat from the absorber to the exterior thereof.

Figure 2:
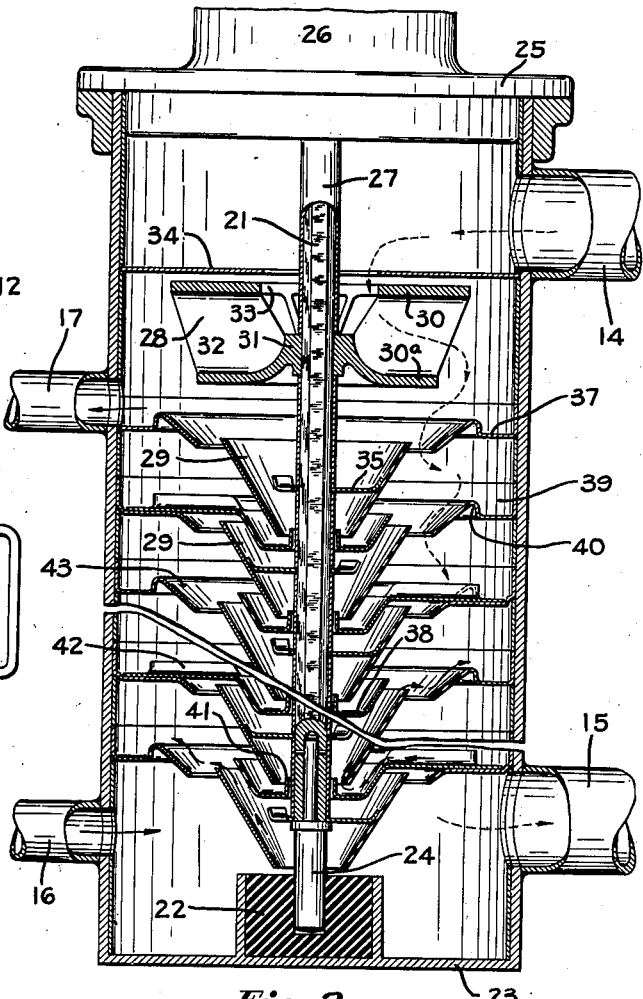
Figure 2 is an enlarged vertical cross sectional view of the absorber shown in Figure 1.

As best shown in Figure 2 the absorber is provided with a vertical shaft 21 which is preferably of non-circular cross-section such as the hexagonal shape shown. The shaft 21 is mounted in suitable bearings, a bearing 22 being provided on the lower end plate 23 of the absorber vessel, as shown in Figure 2, the shaft 21 being provided with the trunnion 24 adapted to fit into the bearing 22 to rotate therein.

The upper end of the shaft 21 may be mounted in a suitable bearing (not shown) in the upper end piece 25 of the absorber vessel and it may be connected to an electric motor, not shown, which may be hermetically sealed to the system within a housing 26 shown fragmentarily in Figure 2 and shown in plan view in Figure 1.

Integrally secured to the shaft 21 by means of sleeves 27 or the like are a fan 28 and a number of whirling cones 29. The fan 28 may be similar in construction to that illustrated and described in the co-pending application of R. S. Nelson, Serial Number 45,528, filed October 18, 1935, for Absorption refrigerating system. More than one fan may be employed and the construction may be varied in a wide variety of ways without departing from the invention. The fan illustrated causes inert gas and refrigerant gas to circulate downwardly through the absorber vessel. To accomplish this, the fan is provided with two shrouds 29 and 30, the lower shroud being integral with the hub 31 which supports the fan upon the shaft 21. Between the shrouds 30 and 30a a number of blades 32 are provided. The upper shroud 30 is provided with an opening 33 through which the gases may be drawn and expelled from the periphery of the blades due to centrifugal action. As shown in Figure 2 the upper shroud 30 is disposed adjacent a baffle plate or fan eye structure 34 secured to the absorber vessel, this plate 34 having an opening aligned with the opening 33 in the fan structure.

Figure 3:
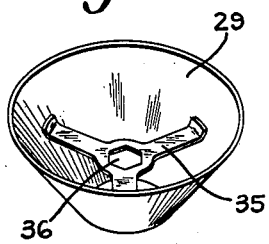
Figure 3 is a perspective view of one of the whirling cones or cups shown in the absorber of Figure 2.

The construction of one of the whirling cones 29 is best illustrated in Figure 3. These devices consist merely of a portion or truncated section of sheet metal or the like provided with a bracing and supporting spider 35 which may be spot welded or otherwise secured on the inside of each of the whirling cones. The spider 35 is provided with a hexagonal opening adapted to engage the shaft 21 so that as the cones 29 are mounted upon the shaft they are held in spaced relation by the sleeves 27 upon the shaft and are thus integrally secured to the shaft.

Figure 5:
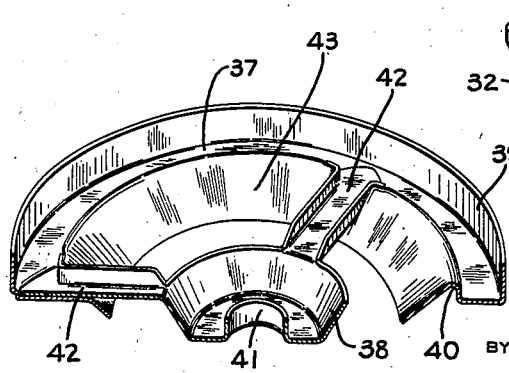
Figure 5 is a fragmentary perspective view of one of the baffles or liquid catching trays used in the absorber of Figures 1 and 2 and adapted to receive liquid from the whirling cones of the type illustrated in Figure 3.
Figure 4:
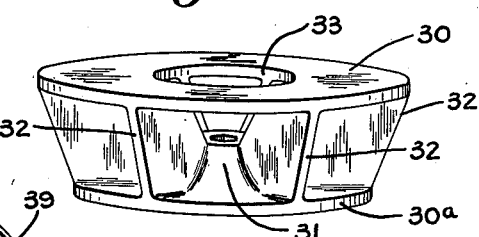
Figure 4 is a perspective view of a fan or gas circulating means employed in the absorber of Figures 1 and 2.

Mounted within the absorber vessel and maintained in stationary relation with respect thereto are a number of baffle plates or liquid receiving devices adapted to receive liquid thrown off from the whirling cones 29. In the arrangement of Figure 2, there are as many liquid receiving devices as there are whirling cones and these receiving devices cooperate with the cones to cause liquid to flow upwardly through the absorber vessel. As best shown in Figure 5 each receiving device has an upper fluid retaining track or recessed portion 37 and a lower cup shaped or pool forming means 38. The upper track 37 is formed by stamping the sheet metal structure of the cup so as to provide an outer rim 39, which also serves to space the receiving members in the absorber vessel, and an inner flange portion 40. The pool forming section 38 is merely cup shaped as illustrated but provided with an inner flange 41 through which the shaft 21 and the retaining sleeves 27 are adapted to pass.

The upper track 37 is connected to the cup 38 at one or more places circumferentially spaced around the receiving devices by means of troughs 42. In the arrangement of Figure 5 three troughs 42 are indicated as being present, these being spaced one hundred and twenty degrees from each other.

Between the trough 42 and integral with the means which provides the track 37 of each baffle plate is an inclined or conical stationary structure 43 which as shown in Figure 2 has its lower rim just below and outside of the upper periphery of the whirling cone 29 with which it is adjacent.

With this construction, absorption liquid supplied to the absorber vessel through the conduit 16 forms a pool in the lower portion thereof around the bearing 22 and the trunnion 24 on the shaft 21. Liquid from this pool is caused to flow upwardly inside of the lower whirling cone 29 and is discharged substantially horizontally and radially from the upper edge of this cone. The discharge of liquid from the upper edge of this cone has sufficient velocity and momentum to cause it to rise upwardly over the inclined surface 43 on the lower receiving member and flow into the track 37 of this member. The liquid then flows through the troughs 42 from the track 37 of the lower receiving member into the cup 38 of that member. The liquid supplied to this cup is then lifted through the inside of the next-to-the-lower whirling cone 29 up to the next receiving member and so on, the lifting or pumping means thus providing a number of stages, each stage causing the liquid to be thrown out radially in intimate contact with inert gas and refrigerant gas being caused to flow downwardly through the absorber vessel by means of the fan 28. At the same time the inert gas flows over the surfaces of the liquid provided on the track 37 and the receiving inclined portions 43 of the plates in the absorber and it is thus brought into intimate contact with the absorption liquid at a number of places. At the same time heat is readily transferred from the interior of the absorber vessel to the wall thereof by means of the metallic structures of the receiving means and may be readily transferred to some cooling medium on the outside of the absorber.

The upper receiving plate catches liquid from the upper whirling cone 29 and merely conveys it to the outlet pipe 17 there being no receiving cup 38 on the upper receiving baffle plate.

The cones 29 have been indicated as constructed of plain stamped material such as sheet metal but it is within the purview of the invention to provide flutes or other irregularities on the inner surface of these cones to aid in the pumping action.

Various other changes may be made in the arrangement and construction of parts without departing from the spirit of the invention or the scope of the annexed claims.

I claim:

1. In an absorption refrigerating system, a vessel for intimately mixing a liquid and a gas and for causing liquid to circulate through said vessel and other parts of the system, said vessel having a plurality of members mounted for rotation therein to lift liquid and throw it outwardly to form sprays, a plurality of members fixed in said vessel for catching the liquid sprays, the members having inclined portions so disposed with relation to the rotating members that the liquid is caused to travel upwardly over the inclined portions thereof, and means for directing liquid which has traveled upwardly over the inclined portion of each of said stationary members into the inlet portion of the next higher lifting member.

2. An absorber adapted for use in an absorption refrigerating system using a refrigerant, a liquid absorbent and an inert gas, said absorber including a closed vessel, means for supplying absorbent to the lower portion of said vessel, means for removing absorbent from the upper portion of said vessel, means for supplying a mixture of inert gas and refrigerant gas to said vessel, means for removing inert gas from said vessel and power driven means within said vessel for circulating the gas and for lifting the absorbent from the lower to the upper portion thereof, said power driven means including a plurality of cone-shaped rotor elements adapted to lift the absorbent as a result of centrifugal action thereon and spray the absorbent outwardly therefrom in contact with the refrigerant and inert gas in said vessel.

3. An absorber adapted for use in an absorption refrigerating system using a refrigerant, a liquid absorbent and an inert gas, said absorber including a closed vessel, means for supplying absorbent to the lower portion of said vessel, means for removing absorbent from the upper portion of said vessel, means for supplying a mixture of inert gas and refrigerant gas to said vessel, means for removing inert gas from said vessel and means within said vessel for circulating the gas through the vessel and for lifting the liquid absorbent therein, said means including a plurality of rotor elements, means for driving said elements to cause them to throw off sprays of liquid absorbent in contact with the gases in said vessel and stationary members in said vessel having inclined portions adjacent said rotor elements for catching the sprays of liquid and causing the liquid to move upwardly as the result of the velocity imparted thereto by said rotor elements.

4. An absorber adapted for use in an absorption refrigerating system including a vessel and an arrangement for bringing gas and liquid into intimate contact in said vessel and for raising the liquid in said vessel, said arrangement including a plurality of liquid throwing rotor elements alternated with stationary liquid receiving elements, each receiving element being designed to catch liquid from one rotor element, convey it upwardly as the result of velocity imparted to it by said one rotor element and then convey it into operative contact with the next higher rotor element.

5. An absorber adapted for use in an absorption refrigerating system including a vessel and an arrangement for bringing gas and liquid into intimate contact in said vessel and for raising the liquid in said vessel, said arrangement including a plurality of liquid throwing rotor elements alternated with stationary liquid receiving elements, each receiving element having an inclined portion adjacent the upper end of one rotor element to catch the liquid thrown off by said one rotor element and cause it to move upwardly as a result of velocity imparted to the liquid by said rotor element, each receiving element also having a cup for forming a pool of liquid at the lower end of the rotor element immediately above the said one rotor element, and each receiving element having means for transferring liquid from its inclined portion to its cup.

6. An absorber having a vertical stack of whirling cones therein for lifting liquid and stationary means for conveying liquid from the top of one cone to the bottom of the next higher cone in the stack.

7. Absorption apparatus comprising a vertically positioned vessel, means for supplying absorption liquid to the lower portion of said vessel and for withdrawing absorption liquid from the top portion thereof, means for supplying a medium to be absorbed to said vessel, a vertical stack of conical elevating and spraying members, a plurality of inclined plates positioned to direct the spray created by each of said members to a higher elevation, means for conveying liquid elevated by each of said members to the bottom portion of the next higher member, means for propelling the medium to be absorbed through said vessel, and common drive means for said propelling means and said members.

8. Absorption refrigerating apparatus comprising a pressure equalizing medium circuit including an evaporator and an absorber, a solution circuit including a boiler and said absorber, means for supplying refrigerant generated in said boiler to said evaporator in liquid phase, said absorber comprising a vertically positioned vessel extending from a point low enough to receive liquid by gravity from the lower portion of said boiler and extending to an elevation high enough to discharge liquid into the upper portion of said boiler by gravity, means within said vessel for elevating absorption liquid therethrough and for creating a plurality of sprays of such liquid, and means for circulating pressure equalizing medium through said sprays.

9. Absorption refrigerating apparatus comprising a boiler, an absorber, said absorber including a vertically arranged vessel positioned to receive liquid from said boiler by gravity and to supply liquid to said boiler by gravity, a plurality of elevating and splashing devices in said absorber, and means for supplying gas to be absorbed to said vessel.

10. Absorption refrigerating apparatus comprising a pressure equalizing medium circuit including an evaporator and an absorber, a solution circuit including a boiler and said absorber, means for supplying refrigerant generated in said boiler to said evaporator in liquid phase, said absorber comprising a vertically positioned vessel, means for supplying liquid from said boiler to the bottom portion of said vessel, means for conveying liquid from the top portion of said vessel into said boiler, means within said vessel for elevating the liquid therethrough and for creating a plurality of sheet like sprays thereof which are directed generally laterally of the vessel, and means for circulating the pressure equalizing medium through said sprays.

ARNOLD D. SIEDLE.